United States Patent
Itadani et al.

(10) Patent No.: US 9,353,867 B2
(45) Date of Patent: May 31, 2016

(54) SLIDING PARTS

(71) Applicant: EAGLE INDUSTRY CO., LTD., Tokyo (JP)

(72) Inventors: Masatoshi Itadani, Tokyo (JP); Yuichiro Tokunaga, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 14/439,024

(22) PCT Filed: Mar. 11, 2014

(86) PCT No.: PCT/JP2014/056322
§ 371 (c)(1),
(2) Date: Apr. 28, 2015

(87) PCT Pub. No.: WO2014/148317
PCT Pub. Date: Sep. 25, 2014

(65) Prior Publication Data
US 2015/0377360 A1    Dec. 31, 2015

(30) Foreign Application Priority Data
Mar. 17, 2013    (JP) ................. 2013-054461

(51) Int. Cl.
*F16J 15/40* (2006.01)
*F16J 15/34* (2006.01)

(52) U.S. Cl.
CPC ............ *F16J 15/3448* (2013.01); *F16J 15/342* (2013.01); *F16J 15/3412* (2013.01); *F16J 15/3416* (2013.01)

(58) Field of Classification Search
CPC ..... F16J 15/34; F16J 15/3404; F16J 15/3408; F16J 15/3412; F16J 15/3416; F16J 15/3424; F16J 151/3428
See application file for complete search history.

(56) References Cited

U.S. PATENT DOCUMENTS

| | | | |
|---|---|---|---|
| 5,201,531 A | 4/1993 | Lai | 277/96.1 |
| 5,498,007 A | 3/1996 | Kulkarni et al. | 277/96.1 |

(Continued)

FOREIGN PATENT DOCUMENTS

| | | | |
|---|---|---|---|
| JP | S60167861 | 11/1985 | F16J 15/34 |
| JP | S6449770 | 2/1989 | F16J 15/34 |

(Continued)

OTHER PUBLICATIONS

International Preliminary Report on Patentability issued in corresponding PCT Patent Appln. Serial No. PCT/JP2014/056322 dated Sep. 22, 2015 (6 pgs).
International Search Report issued in related application No. PCT/JP2014/056322, dated Apr. 30, 2014 (4 pgs).

*Primary Examiner* — Gilbert Lee
(74) *Attorney, Agent, or Firm* — Hayes Soloway P.C.

(57) ABSTRACT

A mechanical seal for sealing faces includes a fluid circulation groove including an inlet section where a fluid comes in from a high pressure fluid side, an outlet section where the fluid goes out to the high pressure fluid side, and a communication section that provides communication between the inlet section and the outlet section is provided in one of sealing faces of a pair of sliding parts that slide on each other. The fluid circulation groove is isolated from a low pressure fluid side by a land section R. At least a sectional area of the groove in the inlet section or the outlet section is set to be different from a sectional area of the groove in the communication section in such a manner that pressure of the fluid flowing through the fluid circulation groove is lowered in the communication section.

13 Claims, 10 Drawing Sheets

(56) References Cited

U.S. PATENT DOCUMENTS

| | | | |
|---|---|---|---|
| 5,702,110 A | 12/1997 | Sedy | 277/96.1 |
| 8,814,433 B2 * | 8/2014 | Tokunaga | F16C 17/045 |
| | | | 277/400 |
| 2003/0209859 A1 | 11/2003 | Young et al. | 277/400 |
| 2013/0209011 A1 * | 8/2013 | Tokunaga | F16C 17/045 |
| | | | 384/123 |

FOREIGN PATENT DOCUMENTS

| | | | |
|---|---|---|---|
| JP | S6449771 | 2/1989 | F16J 15/34 |
| JP | H07180772 | 7/1995 | F16J 15/34 |
| JP | H07224948 | 8/1995 | F16J 15/34 |
| WO | WO 2012046749 A1 * | 4/2012 | F16C 17/045 |
| WO | WO2013035503 | 3/2013 | F16J 15/34 |

* cited by examiner (b)

(a)

(a)

SLIDING PARTS

TECHNICAL FIELD

The present invention relates to sliding parts suitable for a mechanical seal, a bearing, and other sliding portions for example. In particular, the present invention relates to sliding parts such as a sealing ring or a bearing in which a fluid lies on sealing faces to reduce friction and there is a need for preventing fluid leakage from the sealing faces.

BACKGROUND ART

In a mechanical seal serving as one example of the sliding parts, performances thereof are evaluated by a leakage amount, a wear amount, and torque. In the prior art, the performances are enhanced by optimizing sliding material and sealing face roughness of the mechanical seal, so as to realize low leakage, long life, and low torque. However, due to raising awareness of environmental problems in recent years, further improvement in the performances of the mechanical seal is required, and there is a need for technical development going beyond the boundary of the prior art.

Under such circumstances, for example, in a mechanical seal of a water pump used for cooling a water cooling type engine, the present inventor confirmed that over time, LLC additive agents serving as a kind of an antifreeze such as silicate and phosphate (hereinafter, referred to as the "sediment causative substances") are concentrated on sealing faces, sediment is generated, and there is a fear that functions of the mechanical seal are lowered. This generation of the sediment is thought to be a phenomenon that is similarly generated in a mechanical seal of a device in which chemicals and oil are used.

In the conventional mechanical seal, a mechanical seal in which a fluid introduction groove for forming a fluid layer on a sealing face is formed in order to prevent generation of wear and burnout due to friction heat generation of the sealing face is known (for example, refer to Patent Documents 1, 2, 3). However, a mechanical seal to offer a measure for preventing generation of sediment on a sealing face in addition to reduction of leakage and wear is not proposed in a current situation.

CITATION LIST

Patent Document

Patent Document 1: JP7-180772 A
Patent Document 2: JP7-224948 A
Patent Document 3: U.S. Pat. No. 5,498,007 A

SUMMARY OF INVENTION

Technical Problem

An objective of the present invention is to provide sliding parts by which a sealing function of sealing faces can be maintained for a long time by actively taking a fluid into the sealing faces and discharging the fluid from the sealing faces so as to prevent concentration of sediment causative substances on the sealing faces and hence prevent generation of sediment while preventing leakage of the fluid taken into the sealing faces to the low pressure fluid side.

Solution to Problem

In order to achieve the foregoing objective, a first aspect of the present invention is a pair of sliding parts including sealing faces that relatively slide on each other, wherein a fluid circulation groove including an inlet section where a fluid comes in from a high pressure fluid side, an outlet section where the fluid goes out to the high pressure fluid side, and a communication section that provides communication between the inlet section and the outlet section is provided in one of the sealing faces, the fluid circulation groove is isolated from a low pressure fluid side by a land section, and at least a sectional area of the groove in the inlet section or the outlet section is set to be different from a sectional area of the groove in the communication section in such a manner that pressure of the fluid flowing through the fluid circulation groove is lowered in the communication section.

According to this aspect, the sliding parts by which a sealing function of the sealing faces can be maintained for a long time by actively taking the fluid into the sealing faces and discharging the fluid from the sealing faces so as to prevent concentration of sediment causative substances on the sealing faces and hence prevent generation of sediment while lowering the pressure of the fluid flowing through the fluid circulation groove in the communication section and preventing leakage of the fluid taken into the sealing faces to the low pressure fluid side.

A second aspect of the present invention is the sliding parts according to the first aspect, wherein the sectional area of the groove in the inlet section is set to be smaller than the sectional area of the groove in the communication section and the outlet section.

A third aspect of the present invention is the sliding parts according to the first aspect, wherein the sectional area of the groove in the outlet section is set to be larger than the sectional area of the groove in the communication section and the inlet section.

According to these aspects, while ensuring intake of the fluid into the sealing faces, the pressure of the fluid flowing through the fluid circulation groove can be lowered in the communication section.

A fourth aspect of the present invention is the sliding parts according to any of the first to third aspects, wherein the plurality of fluid circulation grooves is provided in the circumferential direction of the sealing face and isolated by the land section.

According to this aspect, the fluid can be taken in evenly over the sealing faces.

A fifth aspect of the present invention is the sliding parts according to any of the first to fourth aspects, wherein a positive pressure generation mechanism including a positive pressure generation groove that is shallower than the fluid circulation groove is provided in a part surrounded by the fluid circulation groove and the high pressure fluid side, and the positive pressure generation mechanism communicates with the inlet section on a downstream side of the inlet section, and is isolated from the outlet section and the high pressure fluid side by the land section.

According to this aspect, a clearance between the sealing faces that relatively slide on each other is extended by positive pressure generated by the positive pressure generation mechanism and a liquid film is formed on the sealing faces, so that a lubricating property can be improved.

A sixth aspect of the present invention is the sliding parts according to the fifth aspect, wherein the positive pressure generation mechanism is formed from a Rayleigh step mechanism.

According to this aspect, by providing a Rayleigh step in the sealing face, the positive pressure generation mechanism can be easily formed.

A seventh aspect of the present invention is the sliding parts according to the fifth or sixth aspect, wherein a negative pressure generation mechanism including a negative pressure generation groove that is shallower than the fluid circulation groove is provided on the outside of the part surrounded by the fluid circulation groove of one of the sealing faces and the high pressure fluid side, and the negative pressure generation groove communicates with the inlet section, and is isolated from the outlet section and the low pressure fluid side by the land section.

According to this aspect, by taking the sealed fluid to be leaked out from the high pressure fluid side to the low pressure fluid side between the adjacent fluid circulation grooves in the part where no Rayleigh step mechanism is provided into the negative pressure generation groove, and returning the fluid to the high pressure fluid side via the fluid circulation groove, a sealing property is improved, so that a sealing property of the entire sealing faces can be improved.

An eighth aspect of the present invention is the sliding parts according to the seventh aspect, wherein the negative pressure generation mechanism is formed from a reversed Rayleigh step mechanism.

According to this aspect, by providing a reversed Rayleigh step in the sealing face, the negative pressure generation mechanism can be easily formed.

A ninth aspect of the present invention is the sliding parts according to any of the first to fourth aspects, wherein a positive pressure generation mechanism including a positive pressure generation groove is provided on a high pressure side of one of the sealing faces, and a negative pressure generation mechanism including a negative pressure generation groove is provided on a low pressure side, the communication section is arranged between the positive pressure generation groove and the negative pressure generation groove, an inlet section is arranged in such a manner that an upstream side of the positive pressure generation groove and the communication section communicate with the high pressure fluid side, an outlet section that provides communication between a downstream side of the negative pressure generation groove and the communication section, and the high pressure fluid side is arranged, and the inlet section and the outlet section are inclined in the directions in which the sections respectively open from the low pressure side toward the high pressure side.

According to this aspect, the lubricating property is improved by the positive pressure generation mechanism, the sealing property is improved by the negative pressure generation mechanism, and in addition, the fluid to flow into the side of the negative pressure generation mechanism from the side of the positive pressure generation mechanism is taken into the communication section and discharged to the high pressure fluid side. Thus, leakage from the sealing faces is furthermore prevented, so that the sealing property can be improved.

Advantageous Effects of Invention

The present invention exhibits the following superior effects.

(1) At least the sectional area of the groove in the inlet section or the outlet section is set to be different from the sectional area of the groove in the communication section in such a manner that the pressure of the fluid flowing through the fluid circulation groove is lowered in the communication section. Thereby, the sliding parts by which the sealing function of the sealing faces can be maintained for a long time by actively taking the fluid into the sealing faces and discharging the fluid from the sealing faces so as to prevent the concentration of the sediment causative substances on the sealing faces and hence prevent the generation of the sediment while lowering the pressure of the fluid flowing through the fluid circulation groove in the communication section and preventing the leakage of the fluid taken into the sealing faces to the low pressure fluid side can be provided.

(2) The sectional area of the groove in the inlet section is set to be smaller than the sectional area of the groove in the communication section and the outlet section, or the sectional area of the groove in the outlet section is set to be larger than the sectional area of the groove in the communication section and the inlet section. Thereby, while ensuring the intake of the fluid into the sealing faces, the pressure of the fluid flowing through the fluid circulation groove can be lowered in the communication section.

(3) The plurality of fluid circulation grooves is provided in the circumferential direction of the sealing face and isolated by the land section. Thereby, the fluid can be taken in evenly over the sealing faces.

(4) The clearance between the sealing faces that relatively slide on each other is extended by the positive pressure generated by the positive pressure generation mechanism and the liquid film is formed on the sealing faces, so that the lubricating property can be improved.

(5) The positive pressure generation mechanism is formed from the Rayleigh step mechanism. Thereby, by providing the Rayleigh step in the sealing face, the positive pressure generation mechanism can be easily formed.

(6) By taking the sealed fluid to be leaked out from the high pressure fluid side to the low pressure fluid side between the adjacent fluid circulation grooves in the part where no Rayleigh step mechanism is provided into the negative pressure generation groove, and returning the fluid to the high pressure fluid side via the fluid circulation groove, the sealing property i improved, so that the sealing property of the entire sealing faces can be improved.

(7) The negative pressure generation mechanism is formed from the reversed Rayleigh step mechanism. Thereby, by providing the reversed Rayleigh step in the sealing face, the negative pressure generation mechanism can be easily formed.

(8) The lubricating property is improved by the positive pressure generation mechanism, the sealing property is improved by the negative pressure generation mechanism, and in addition, the fluid to flow into the side of the negative pressure generation mechanism from the side of the positive pressure generation mechanism is taken into the communication section and discharged to the high pressure fluid side. Thus, the leakage from the sealing faces is furthermore prevented, so that the sealing property can be improved.

BRIEF DESCRIPTION OF DRAWINGS

FIG. 2($a$) shows a case where a plurality of fluid circulation grooves is provided in the circumferential direction independently from each other and formed in a substantial V shape; and FIG. 2($b$) shows a case where a plurality of fluid circulation grooves is provided in the circumferential direction independently from each other and formed in a linear shape;

FIG. 3($a$)

shows a case where a plurality of fluid circulation grooves is provided in the circumferential direction independently from each other and formed in a substantial U shape; and FIG. 3(b) shows a case where fluid circulation grooves are provided so as to communicate with each other in the circumferential direction;

FIG. 10 is a view for illustrating the positive pressure generation mechanism formed by a Rayleigh step mechanism or the like, and the negative pressure generation mechanism formed by a reversed Rayleigh step mechanism or the like: FIG. 10(a) shows the Rayleigh step mechanism; and FIG. 10(b) shows the reversed Rayleigh step mechanism.

DESCRIPTION OF EMBODIMENTS

Hereinafter, with reference to the drawings, modes for carrying out the present invention will be described with examples based on embodiments. However, regarding size, material, shape, and relative arrangement of constituent parts described in the embodiments, and the like, there is no intention to limit the scope of the present invention only to those unless specifically and clearly described.

First Embodiment

With reference to FIGS. 1 to 5, sliding parts according to a first embodiment of the present invention will be described.

It should be noted that in the following embodiment, a mechanical seal serving as one example of the sliding parts will be described as an example. In the description, an outer peripheral side of the sliding parts that form the mechanical seal serves as a high pressure fluid side (sealed fluid side), and an inner peripheral side serves as a low pressure fluid side (atmosphere side). However, the present invention is not limited to this but can also be applied to a case where the high pressure fluid side and the low pressure fluid side are set the other way around.

Figure 1:
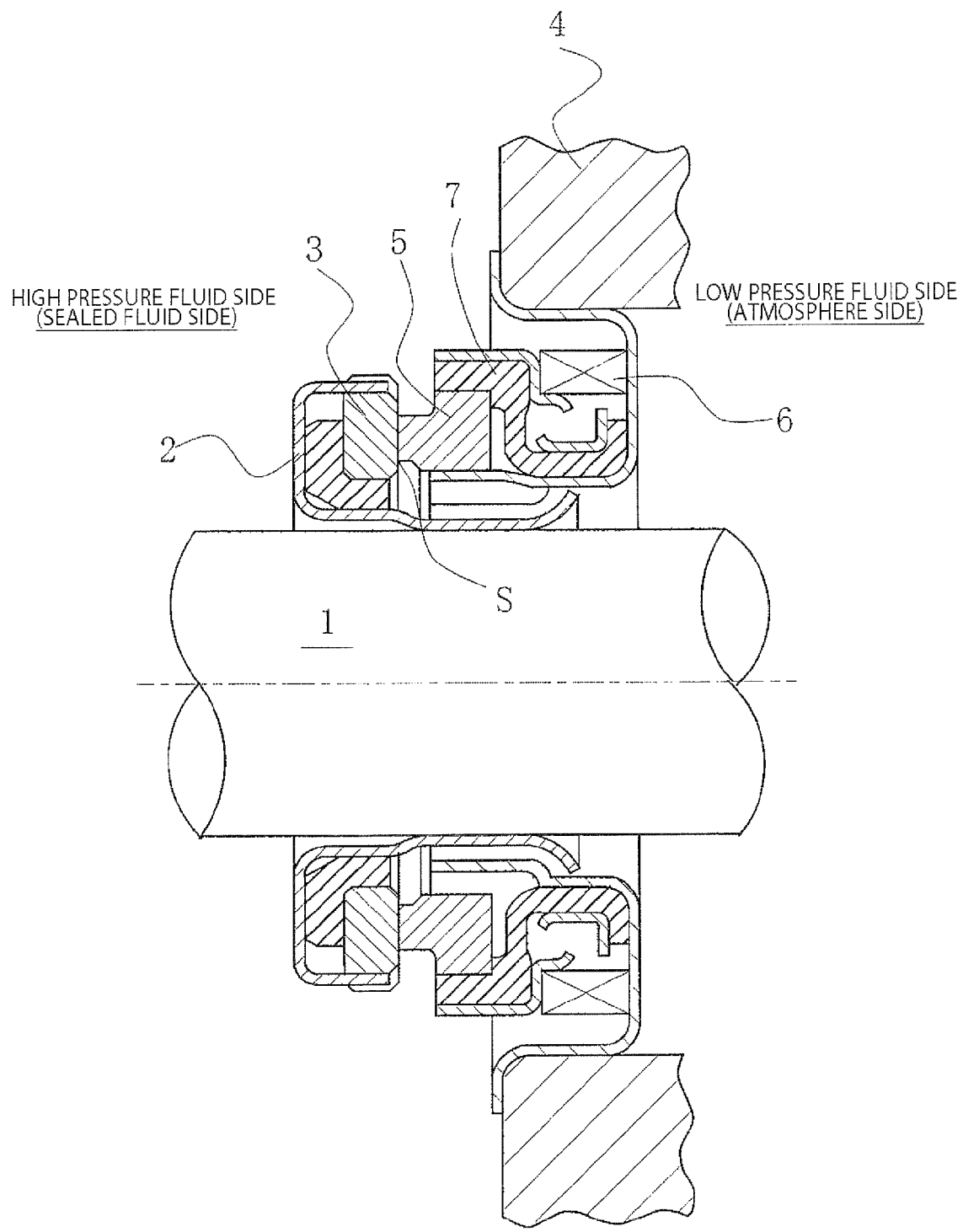
FIG. 1 is a vertically sectional view showing one example of a mechanical seal according to a first embodiment of the present invention.

FIG. 1 is a vertically sectional view showing one example of the mechanical seal that is an inside mechanical seal for sealing a sealed fluid on the high pressure fluid side to be leaked out from an outer periphery of a sealing face toward an inner periphery. In the mechanical seal, on the side of a rotating shaft 1 that drives a pump impeller (not shown) on the high pressure fluid side, an annular rotating ring 3 serving as one of the sliding parts is provided via a sleeve 2 in a state that the rotating ring can be rotated integrally with this rotating shaft 1, an annular stationary ring 5 serving as the other sliding part is provided in a housing 4 of a pump in a state that the stationary ring is not rotated but can be moved in the axial direction, and sealing faces S mirror-finished by lapping or the like closely slide on each other by means of a coiled wave spring 6 and bellows 7 that bias the stationary ring 5 in the axial direction. That is, this mechanical seal is to prevent the sealed fluid from flowing out from an outer periphery of the rotating shaft 1 to the atmosphere side on the sealing faces S of the rotating ring 3 and the stationary ring 5.

It should be noted that although FIG. 1 shows a case where the sealing face width of the rotating ring 3 is greater than the sealing face width of the stationary ring 5, the present invention is not limited to this but can be applied to an opposite case as a matter of course.

Figure 2:
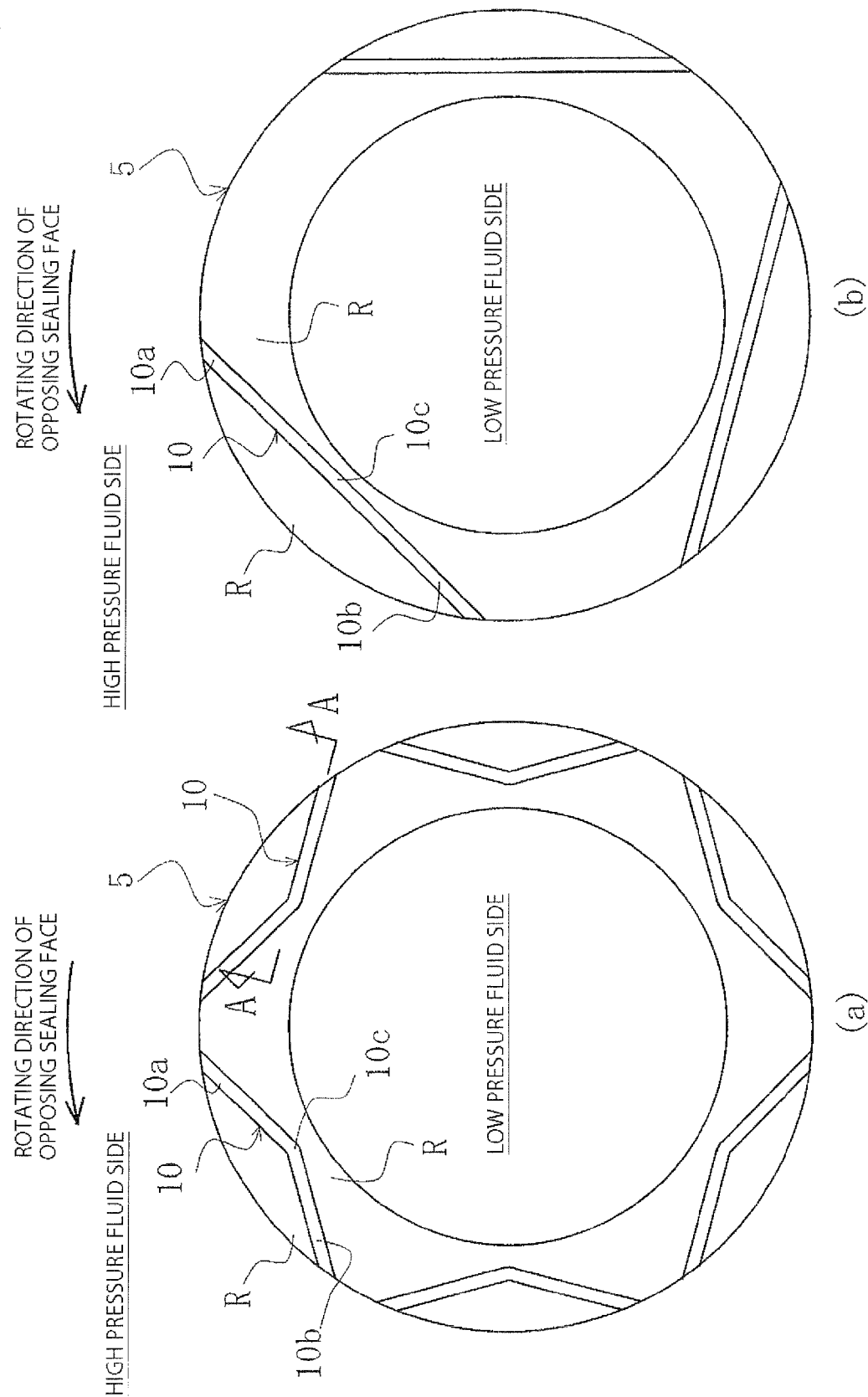
FIG. 2 shows a sealing face of a sliding part according to the first embodiment of the present invention.

FIG. 2 shows the sealing face of the sliding part according to the first embodiment of the present invention. A case where fluid circulation grooves are formed on the sealing face of the stationary ring 5 of FIG. 2 will be described as an example.

It should be noted that a case where the fluid circulation grooves are formed on the sealing face of the rotating ring 3 is basically similar. However, in that case, the fluid circulation grooves are only required to communicate with the sealed fluid side and hence not required to be provided up to the outer peripheral side of the sealing face.

In FIG. 2(a), the outer peripheral side of the sealing face of the stationary ring 5 serves as the high pressure fluid side, the inner peripheral side serves as the low pressure fluid side such as the atmosphere side, and the opposing sealing face is rotated anti-clockwise.

On the sealing face of the stationary ring 5, a plurality of fluid circulation grooves 10 that communicates with the high pressure fluid side and is isolated from the low pressure fluid side by a smooth section R (sometimes referred to as the "land section" in the present invention) of the sealing face is provided in the circumferential direction.

Each of the fluid circulation grooves 10 includes an inlet section 10a where the fluid comes in from the high pressure fluid side, an outlet section 10b where the fluid goes out to the high pressure fluid side, and a communication section 10c that provides communication between the inlet section 10a and the outlet section 10b in the circumferential direction. The fluid circulation groove 10 plays a role of actively introducing the sealed fluid onto the sealing face from the high pressure fluid side and discharging the fluid in order to prevent concentration of the fluid containing corrosion products on the sealing face. The inlet section 10a and the outlet section 10b are formed in such a manner that the sealed fluid is easily taken onto the sealing face and discharged in accordance with the rotating direction of the opposing sealing face, while the fluid circulation groove is isolated from the low pressure fluid side by the land section R in order to reduce leakage.

It should be noted that although the fluid circulation groove 10 is isolated from the low pressure fluid side by the land section R, a tiny amount of leakage is unavoidable as long as pressure gradient from the low pressure fluid side exists. Since the pressure gradient is maximum in the communication section 10c which is near the low pressure fluid side as in the fluid circulation groove 10 shown in FIG. 2(a), the leakage of the fluid from the communication section 10c is easily generated.

In this example, in the fluid circulation groove 10, inclination angles of the inlet section 10a and the outlet section 10b are set to be large, both the sections are arranged in a substantially V form so as to cross each other on the low pressure fluid side (on the inner peripheral side in FIG. 2), and this crossing portion forms the communication section 10c. Although a crossing angle between the inlet section 10a and the outlet section 10*b* is an obtuse angle (such as about 150°), the present invention is not limited to this. The inclination of the inlet section 10*a* and the outlet section 10*b* may be further increased, or the sections may be formed not in a linear shape but in a curved shape (such as an arc shape). The width and the depth of the fluid circulation groove 10 are set to be optimal in accordance with pressure, a type (viscosity), and the like of the sealed fluid. This point will be described in detail later.

It should be noted that in this description, the phrase "the inclination angles of the inlet section and the outlet section are large" indicates that for example in FIG. 2, the inlet section and the outlet section are inclined in such a manner that the respective inclination angles of the sections open more largely than the lines connecting the inlet section and the outlet section and the center of the stationary ring toward the high pressure fluid side.

In each of the fluid circulation grooves 10 shown in FIG. 2(*a*), the inclination angles of the inlet section 10*a* and the outlet section 10*b* are large. Thus, the fluid easily flows into the inlet section 10*a* and the fluid is easily discharged from the outlet section 10*b*. The length of the communication section 10*c* which is near the inflow low pressure fluid side is short. Thus, the leakage from the communication section 10*c* to the low pressure fluid side is reduced.

The stationary ring 5 shown in FIG. 2(*b*) is different from FIG. 2(*a*) in a point that the shape of the fluid circulation grooves 10 is a substantially linear shape, and also differentiated in a point that three fluid circulation grooves 10 are arranged at equal intervals in the circumferential direction. However, the other basic configurations are the same as FIG. 2(*a*).

In each of the fluid circulation grooves 10 shown in FIG. 2(*b*), the inlet section 10*a*, the communication section 10*c*, and the outlet section 10*b* are formed in a substantially linear shape. Thus, the fluid is easily distributed from the inlet section 10*a* to the outlet section 10*b*, and further, the leakage from the communication section 10*c* to the low pressure fluid side is small.

Figure 3:
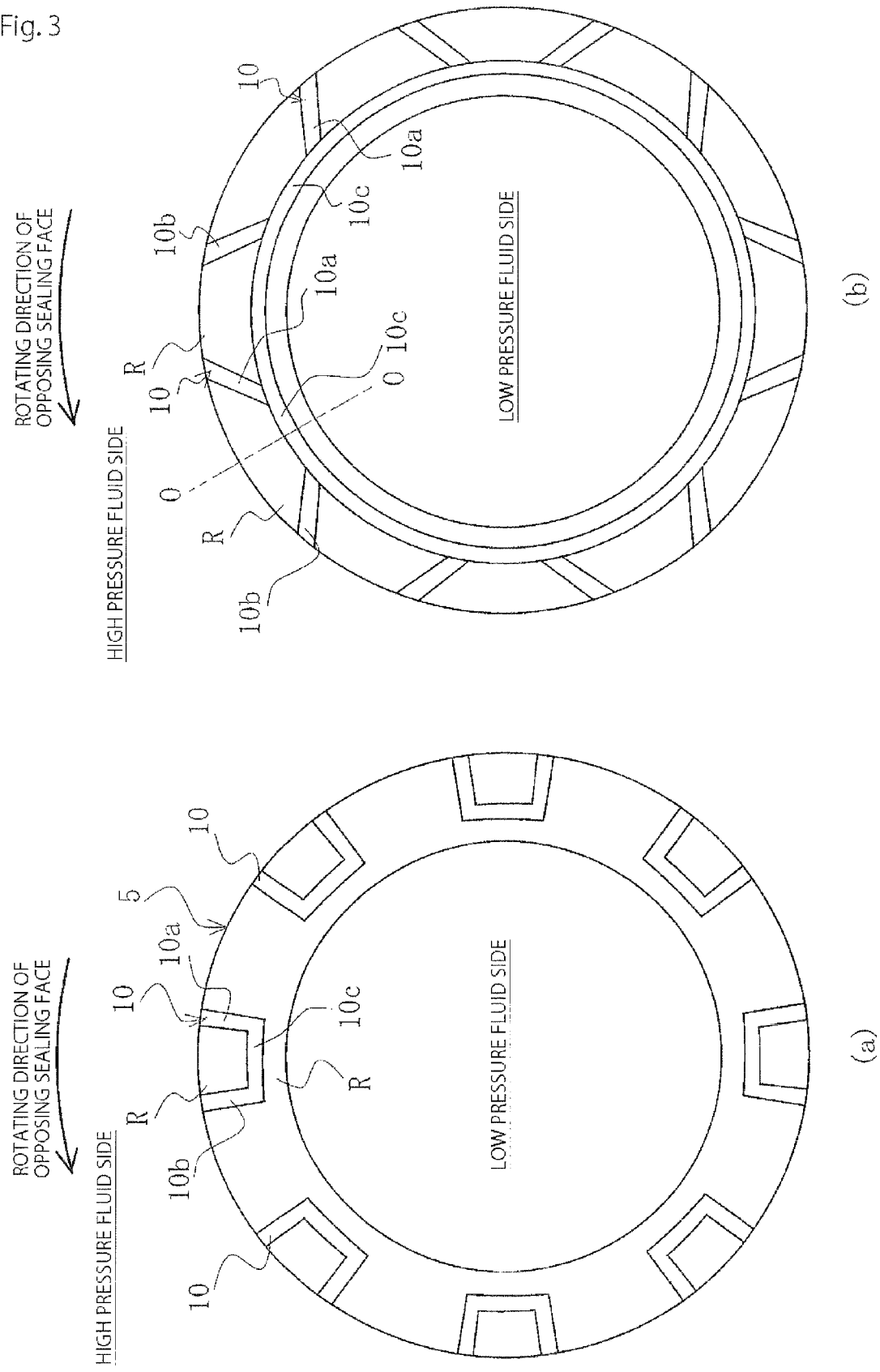
FIG. 3 shows the sealing face of the sliding part according to the first embodiment of the present invention.

The stationary ring 5 shown in FIG. 3(*a*) is different from FIG. 2(*a*) in a point that the shape of the fluid circulation grooves 10 is a substantially U shape, and also differentiated in a point that eight fluid circulation grooves 10 are arranged at equal intervals in the circumferential direction. However, the other basic configurations are the same as FIG. 2(*a*).

In each of the fluid circulation grooves 10 shown in FIG. 3(*a*), the inlet section 10*a* and the outlet section 10*b* open toward the high pressure fluid side so as to pass through the center of the stationary ring, and inner peripheral ends of the inlet section 10*a* and the outlet section 10*b* are connected by the arc shape communication section 10*c* with the center of the stationary ring 5 serving as the circle center.

The stationary ring 5 shown in FIG. 3(*b*) is different from FIG. 3(*a*) in a point that the fluid circulation grooves are provided so as to communicate with each other in the circumferential direction, and also differentiated in a point that twelve fluid circulation grooves 10 are arranged at equal intervals in the circumferential direction. However, the other basic configurations are the same as FIG. 3(*a*).

In FIG. 3(*b*), as well as FIG. 3(*a*), plural pairs of inlet sections 10*a* and the outlet sections 10*b* of the fluid circulation grooves 10 that communicate with the high pressure fluid side and are isolated from the low pressure fluid side by the smooth section R of the sealing face are provided in the circumferential direction. The communication section 10*c* provides communication between the inner peripheral ends of the pairs of inlet sections 10*a* and outlet sections 10*b*, and extends over the whole circumference so as to provide communication between communication portions of all the fluid circulation grooves 10. For example, the inlet section 10*a* and the outlet section 10*b* of each of the fluid circulation grooves 10 open toward the high pressure fluid side with respect to the center line O-O, and are formed symmetrically, so that an intersection angle between the inlet section 10*a* and the outlet section 10*b* is set to be an obtuse angle (such as about 120°).

Next, with reference to FIGS. 4 and 5, the sectional shape of the fluid circulation groove will be described.

Figure 4:
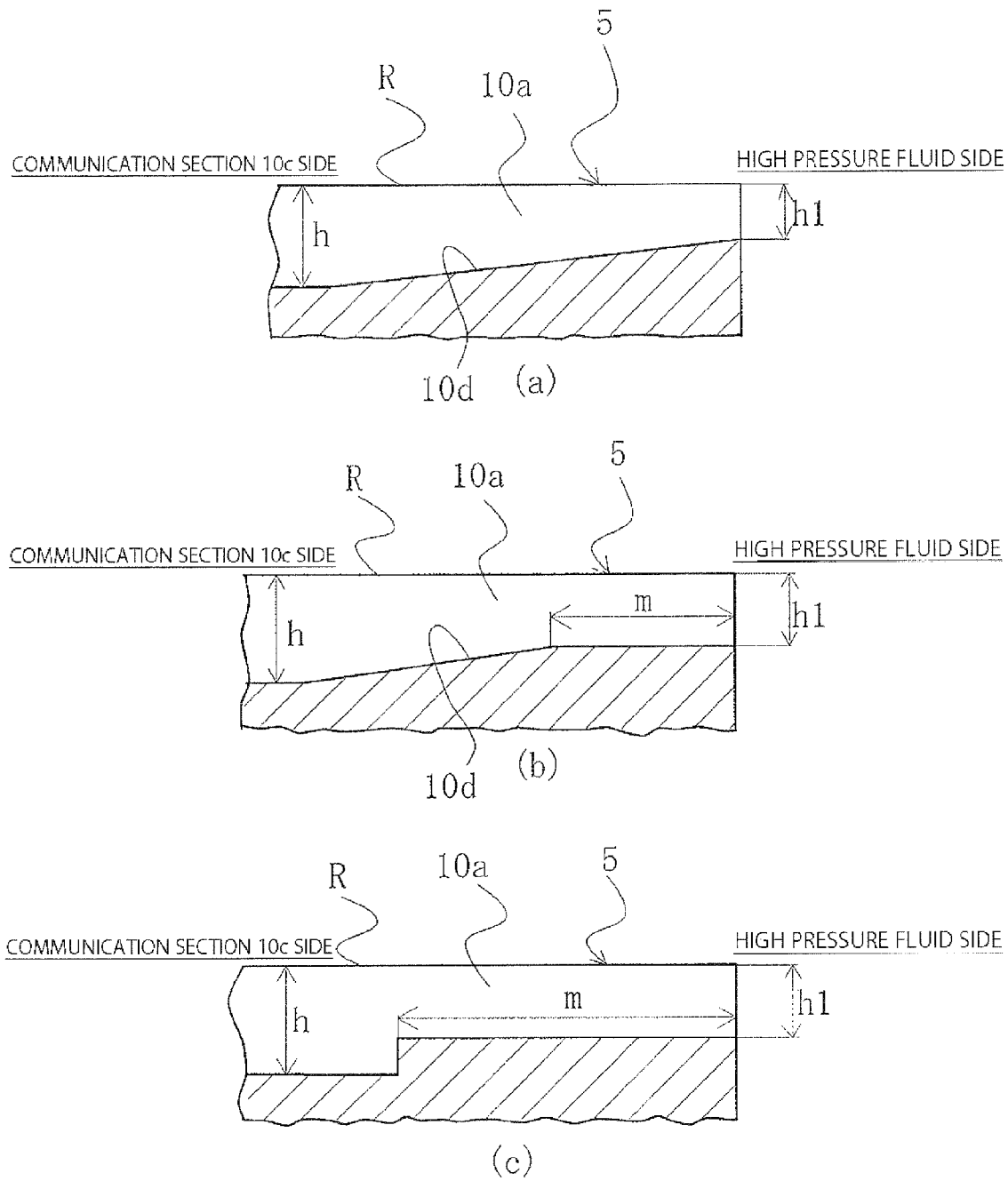
FIG. 4 is a sectional view taken along the line A-A of FIG. 2(a) for illustrating a vertically sectional shape of an inlet section of the fluid circulation groove.

FIG. 4 is a sectional view taken along the line A-A of FIG. 2(*a*) showing a vertically sectional shape of the inlet section of the fluid circulation groove.

In FIG. 4(*a*), the groove depth h1 of the inlet section 10*a* of the fluid circulation groove is set to be smaller than the groove depth h of the communication section 10*c* and the outlet section 10*b* on an inlet face facing the high pressure fluid side. In this case, the groove width of the inlet section 10*a*, the communication section 10*c*, and the outlet section 10*b* is fixed.

In the inlet section 10*a* shown in FIG. 4(*a*), the groove depth from the land section R to a groove bottom face 10*d* is set to be h1 on the inlet face facing the high pressure fluid side, and the bottom face 10*d* is formed in a tapered shape in such a manner that the inlet section becomes gently deeper toward the communication section 10*c*.

In the inlet section 10*a* shown in FIG. 4(*b*), the groove depth from the land section R to the groove bottom face 10*d* is set to be h1 for a fixed distance m from the inlet face facing the high pressure fluid side, and then the inlet section is formed in a tapered shape so as to become gently deeper toward the communication section 10*c*.

In the inlet section 10*a* shown in FIG. 4(*c*), the groove depth from the land section R to the groove bottom face 10*d* is set to be h1 for the fixed distance m from the inlet face facing the high pressure fluid side, and then the inlet section is formed to be as deep as the groove depth h by a step section.

As described above, the groove depth h1 of the inlet section 10*a* of the fluid circulation groove 10 shown in FIG. 4 is set to be smaller than the groove depth h of the communication section 10*c* and the outlet section 10*b*. Thus, even in a case where the groove width is fixed, the sectional area of the groove is smaller in the inlet section 10*a* than in the communication section 10*c* and the outlet section 10*b*. Therefore, in comparison to a case where the sectional area of the fluid circulation groove 10 is fixed as the same size as the communication section 10*c* and the outlet section 10*b*, an inflow amount of the fluid into the fluid circulation groove 10 is reduced, and the pressure of the fluid in the communication section 10*c* which is the nearest to the low pressure fluid side is also reduced. As a result, the pressure gradient between the communication section 10*c* and the low pressure fluid side is decreased, so that the leakage from the communication section 10*c* which is the nearest to the low pressure fluid side is reduced.

Next, with reference to FIG. 5, a case where the sectional area of the groove is changed depending on the magnitude of the groove width of the fluid circulation groove 10 will be described.

Figure 5:
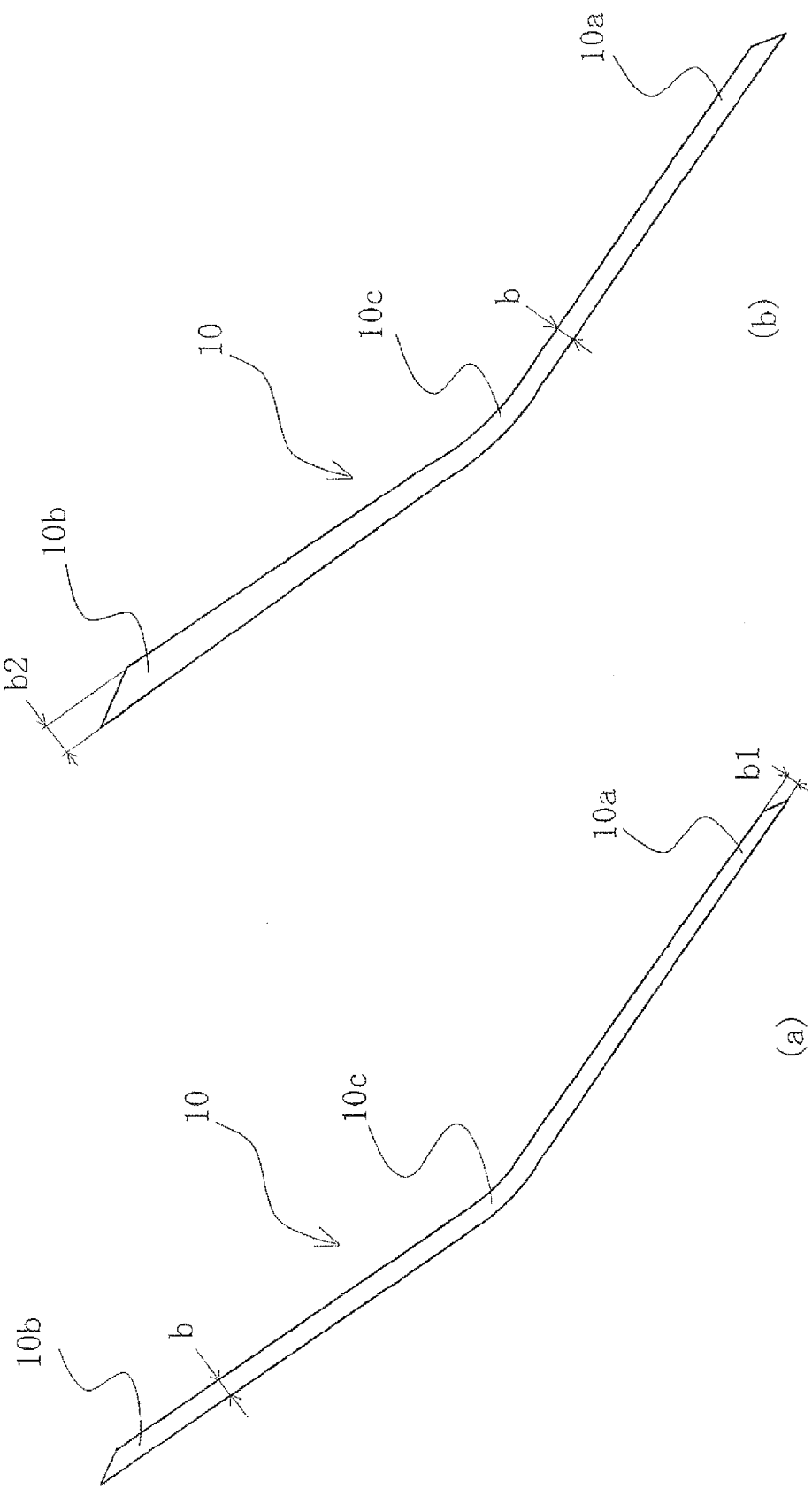
FIG. 5 is a view for illustrating a planar shape of the fluid circulation groove provided in the sealing face of the sliding part according to the first embodiment of the present invention.

FIG. 5(*a*) shows a case where the groove width b1 of the inlet section 10*a* is set to be smaller than the groove width b of the communication section 10*c* and the outlet section 10*b*. In this case, the groove depth of the inlet section 10*a*, the communication section 10*c*, and the outlet section 10*b* is fixed.

In the inlet section 10*a* shown in FIG. 5(*a*), the groove width is set to be b1 on the inlet face facing the high pressure fluid side and the inlet section is formed in a tapered shape in such a manner that the groove width is gently enlarged toward the communication section 10c and becomes the groove width b.

As a mode that the groove width b1 of the inlet section 10a is enlarged toward the communication section 10c, in addition to the case where the groove width is set to be the groove width b1 for a fixed distance from the inlet face facing the high pressure fluid side and then gently enlarged toward the communication section 10c, the groove width may be set to be the groove width b1 for the fixed distance from the inlet face facing the high pressure fluid side and then radically enlarged to the groove width b by a step section.

FIG. 5(b) shows a case where the groove width b2 of the outlet section 10b is set to be larger than the groove width b of the communication section 10c and the inlet section 10a. In this case, the groove depth of the inlet section 10a, the communication section 10c, and the outlet section 10b is the same.

The outlet section 10b shown in FIG. 5(b) is gently enlarged from the communication section 10c toward the outlet section 10b and formed in a tapered shape in such a manner that the groove width becomes b2 on an outlet face facing the high pressure fluid side.

As a mode that the groove width b2 of the outlet section 10b is enlarged from the communication section 10c toward the outlet section 10b, in addition to the case where the groove width is the groove width b2 for the fixed distance from the outlet face facing the high pressure fluid side and then set to be gently reduced toward the communication section 10c, the groove width may be the groove width b2 for the fixed distance from the outlet face facing the high pressure fluid side and then set to be radically reduced to the groove width b by a step section.

As described above, as shown in FIG. 5(a), even in a case where the groove width b1 of the inlet section 10a of the fluid circulation groove 10 is set to be smaller than the groove width b of the communication section 10c and the outlet section 10b and in a case where the groove depth is fixed, the sectional area of the groove is smaller in the inlet section 10a than in the communication section 10c and the outlet section 10b. Therefore, in comparison to a case where the sectional area in the inlet section 10a of the fluid circulation groove 10 is fixed as the same size as the communication section 10c and the outlet section 10b, the inflow amount of the fluid into the fluid circulation groove 10 is reduced, and the pressure of the fluid in the communication section 10c which is the nearest to the low pressure fluid side is also reduced. As a result, the pressure gradient between the communication section 10c and the low pressure fluid side is decreased, so that the leakage from the communication section 10c which is the nearest to the low pressure fluid side is reduced.

As shown in FIG. 5(b), even in a case where the groove width b2 of the outlet section 10b is set to be larger than the groove width b of the communication section 10c and the inlet section 10a and in a case where the groove depth is fixed, the sectional area of the groove is larger in the outlet section 10b than in the communication section 10c and the inlet section 10a. Therefore, in comparison to a case where the sectional area in the outlet section 10b of the fluid circulation groove 10 is fixed as the same size as the communication section 10c and the inlet section 10a, discharge resistance of the fluid in the outlet section 10b is decreased, and the pressure of the fluid in the communication section 10c is reduced. As a result, the pressure gradient between the communication section 10c and the low pressure fluid side is decreased, so that the leakage from the communication section 10c which is the nearest to the low pressure fluid side is reduced.

It should be noted that although the case where any one of the groove depth and the groove width is fixed and the other is changed is described above, both the groove depth and the groove width may be changed. The point is that the sectional area is required to be changed as desired.

As described above, according to the configuration of the first embodiment, by actively guiding the fluid to the sealing faces and discharging the fluid by the fluid circulation groove 10, the fluid between the sealing faces is circulated, concentration of the fluid containing sediment causative substances and the like and retention of wear powder and foreign substances are prevented, and hence formation of sediment is prevented, so that a sealing function of the sealing faces can be maintained for a long time. At that time, at least the sectional area of the groove in the inlet section 10a or the outlet section 10b is set to be different from the sectional area of the groove in the communication section 10c in such a manner that the pressure of the fluid flowing through the fluid circulation groove 10 is lowered in the communication section 10c. More specifically, the sectional area of the groove in the inlet section 10a is set to be smaller than the sectional area of the groove in the communication section 10c and the outlet section 10b, or the sectional area of the groove in the outlet section 10b is set to be larger than the sectional area of the groove in the communication section 10c and the inlet section 10a. Thus, the leakage of the fluid to the low pressure fluid side from the communication section 10c placed in the part of the fluid circulation groove 10 which is the nearest to the low pressure fluid side can be furthermore reduced.

Second Embodiment

Figure 6:
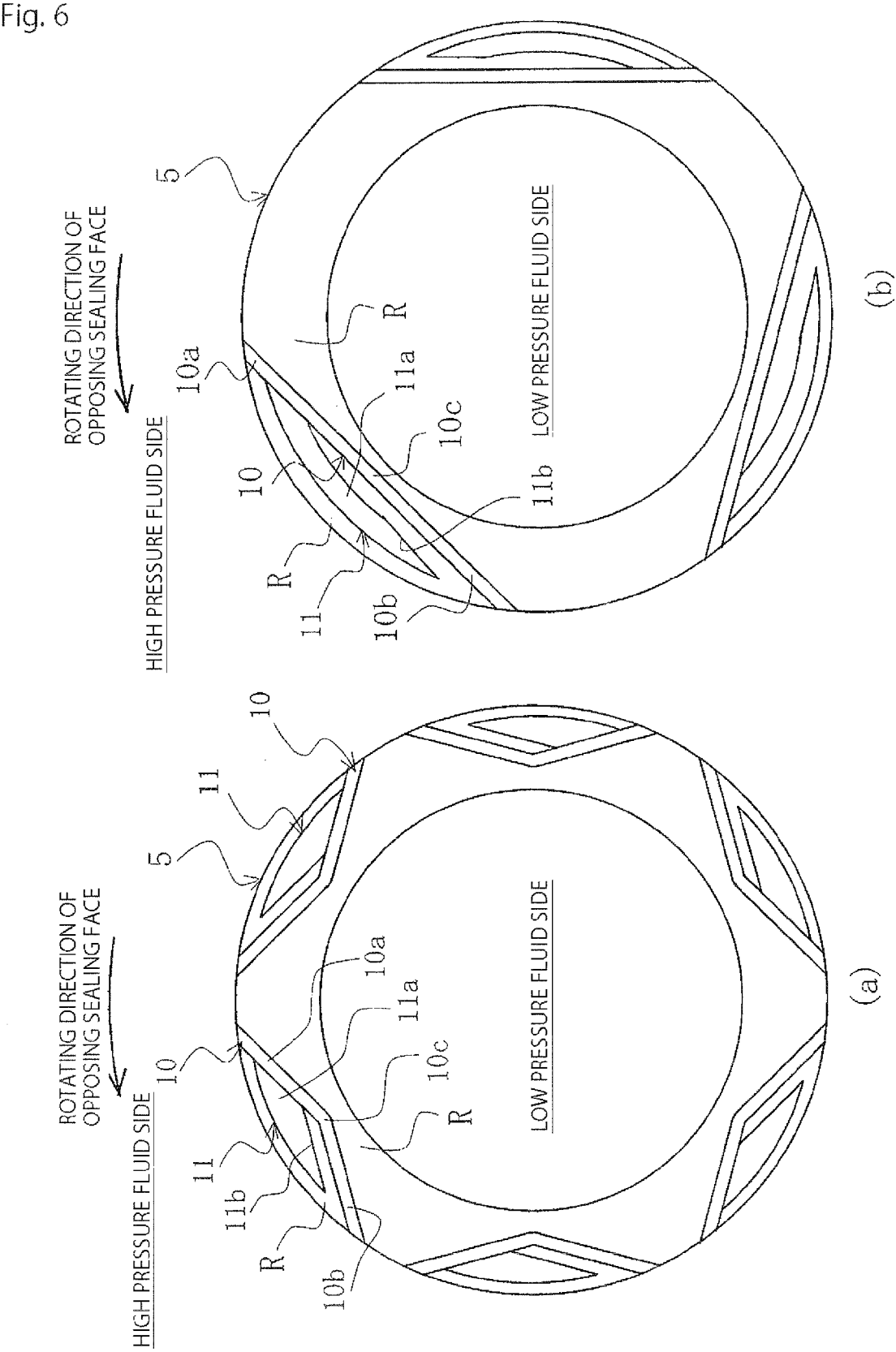
FIG. 6 shows a sealing face of a sliding part according to a second embodiment of the present invention, showing a case where positive pressure generation mechanisms are added to the sealing face shown in FIG. 2.
Figure 7:
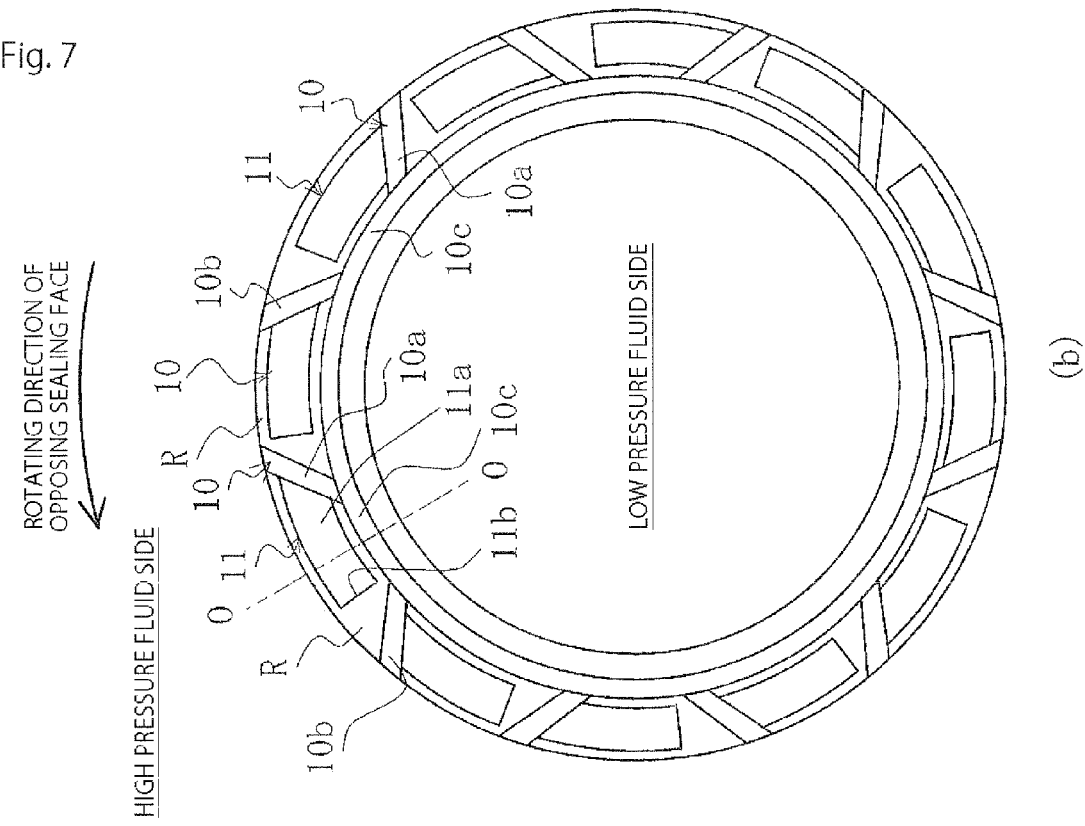
FIG. 7 shows the sealing face of the sliding part according to the second embodiment of the present invention, showing a case where the positive pressure generation mechanisms are added in the sealing face shown in FIG. 3.
Figure 7:
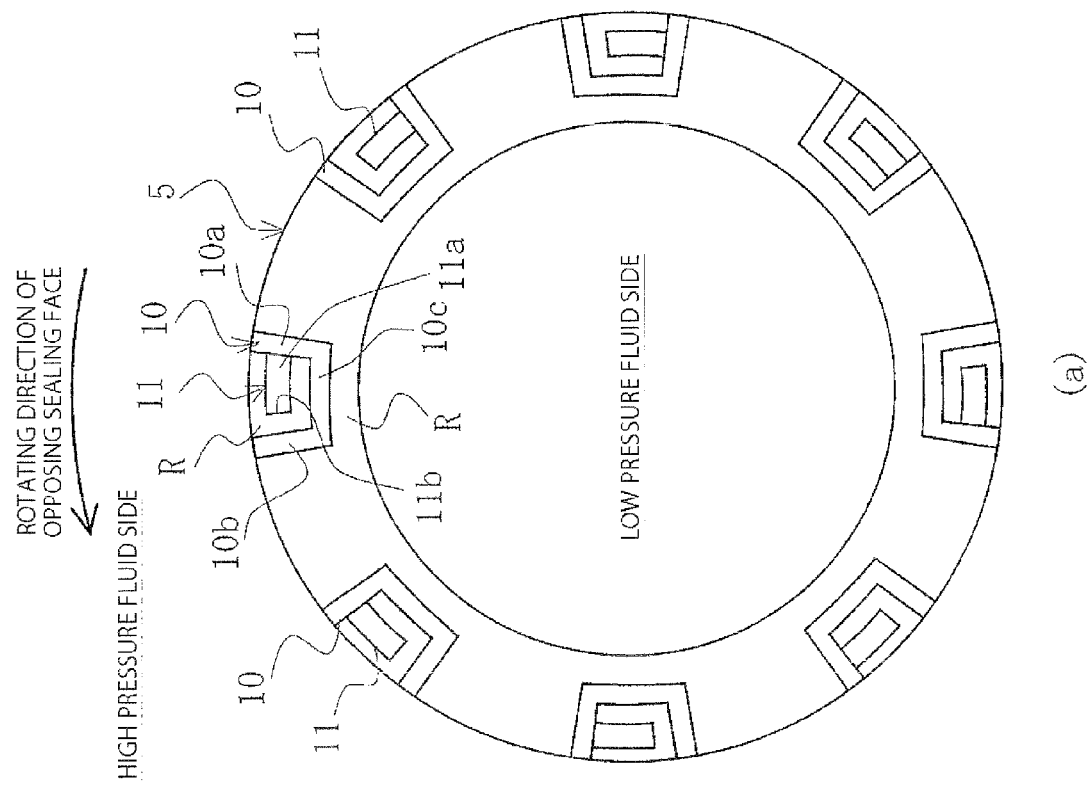

With reference to FIGS. 6 and 7, sliding parts according to a second embodiment of the present invention will be described.

The sliding parts according to the second embodiment are different from the sliding parts of the first embodiment in a point that the positive pressure generation mechanism is additionally provided in the part of the sealing face surrounded by the fluid circulation groove and the high pressure fluid side. However, the other basic configurations are the same as the first embodiment: that is, at least the sectional area of the groove in the inlet section 10a or the outlet section 10b is set to be different from the sectional area of the groove in the communication section 10c in such a manner that the pressure of the fluid flowing through the fluid circulation groove 10 is lowered in the communication section 10c, more specifically, the sectional area of the groove in the inlet section 10a is set to be smaller than the sectional area of the groove in the communication section 10c and the outlet section 10b, or the sectional area of the groove in the outlet section 10b is set to be larger than the sectional area of the groove in the communication section 10c and the inlet section 10a, and thus the leakage of the fluid to the low pressure fluid side from the communication section 10c placed in the part of the fluid circulation groove 10 which is the nearest to the low pressure fluid side can be furthermore reduced. The same members will be given the same reference signs and duplicated description will be omitted.

In the stationary ring 5 shown in FIG. 6(a), on the sealing face in which the fluid circulation grooves 10 are provided, a positive pressure generation mechanism 11 including a positive pressure generation groove 11a that is shallower than the fluid circulation groove 10 is provided in a part surrounded by each of the fluid circulation grooves 10 and the high pressure fluid side.

The positive pressure generation groove 11a communicates with the inlet section of the fluid circulation groove 10, and is isolated from the outlet section 10b and the high pressure fluid side by the land section R.

In this example, the positive pressure generation mechanism 11 is formed from a Rayleigh step mechanism including a groove 11a that communicates with the inlet section 10a of the fluid circulation groove 10 and a Rayleigh step 11b. However, the present invention is not limited to this. For example, the positive pressure generation mechanism may be formed from a femto groove with a dam, that is, any mechanism that generates positive pressure.

It should be noted that the Rayleigh step mechanism will be described in detail later.

The stationary ring 5 shown in FIG. 6(b) is different from FIG. 6(a) in a point that the shape of the fluid circulation grooves 10 is a substantially linear shape, and also differentiated in a point that three fluid circulation grooves 10 are arranged at equal intervals in the circumferential direction. However, the other basic configurations are the same as FIG. 6(a).

The stationary ring 5 shown in FIG. 7(a) is different from FIG. 6(a) in a point that the shape of the fluid circulation grooves 10 is a substantially U shape, and also differentiated in a point that eight fluid circulation grooves 10 are arranged at equal intervals in the circumferential direction. However, the other basic configurations are the same as FIG. 6(a).

In each of the fluid circulation grooves 10 shown in this example, the inlet section 10a and the outlet section 10b open toward the high pressure fluid side so as to pass through the center of the stationary ring 5, and inner peripheral parts of the inlet section 10a and the outlet section 10b are connected by the arc shape communication section 10c with the center of the stationary ring serving as the circle center.

The stationary ring 5 shown in FIG. 7(b) is different from FIG. 7(a) in a point that the fluid circulation grooves are provided so as to communicate with each other in the circumferential direction, and also differentiated in a point that twelve fluid circulation grooves 10 are arranged at equal intervals in the circumferential direction. However, the other basic configurations are the same as FIG. 7(a).

In FIG. 7(b), as well as FIG. 7(a), plural pairs of inlet sections 10a and outlet sections 10b of the fluid circulation grooves 10 that communicate with the high pressure fluid side and are isolated from the low pressure fluid side by the smooth section R of the sealing face are provided in the circumferential direction. The communication section 10c provides communication between the inner peripheral ends of the pairs of inlet sections 10a and outlet sections 10b, and extends over the whole circumference so as to provide communication between the communication portions of all the fluid circulation grooves 10. For example, the inlet section 10a and the outlet section 10b of each of the fluid circulation grooves 10 open toward the high pressure fluid side with respect to the center line O-O, and are formed symmetrically, so that the intersection angle between the inlet section 10a and the outlet section 10b is set to be an obtuse angle (such as about 120°).

In the second embodiment, the positive pressure generation mechanism 11 suctions the fluid from the high pressure fluid side via the inlet section 10a of the fluid circulation groove 10 on an upstream side thereof, generates positive pressure, extends a clearance between the sealing faces that relatively slide on each other by the generated positive pressure, and forms a liquid film on the sealing faces, so as to improve a lubricating property.

Third Embodiment

Figure 8:
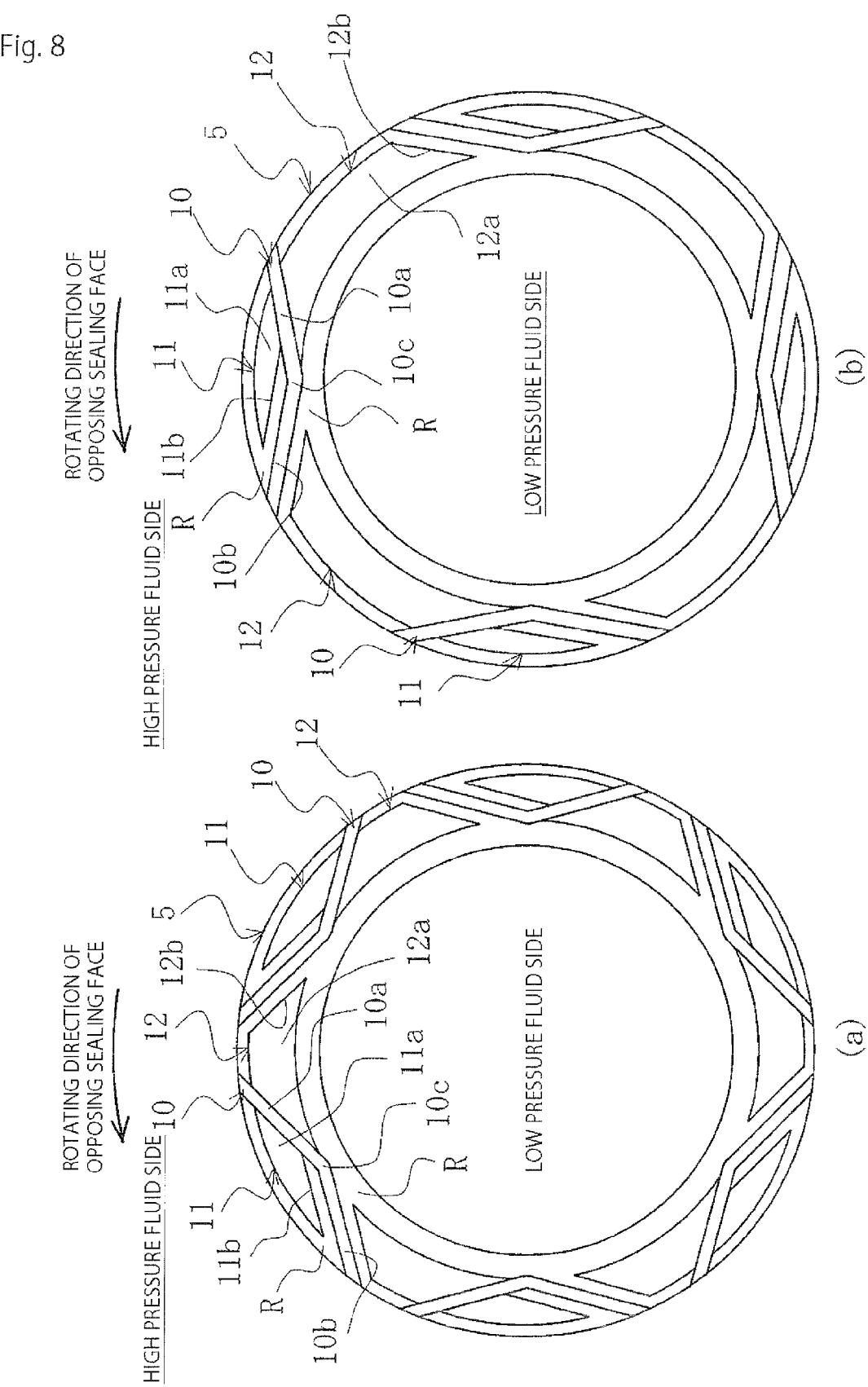
FIG. 8 shows a sealing face of a sliding part according to a third embodiment of the present invention.

With reference to FIG. 8, sliding parts according to a third embodiment of the present invention will be described.

The sliding parts according to the third embodiment are different from the sliding parts of the second embodiment in a point that a negative pressure generation mechanism is additionally provided on the outside of the part of the sealing face surrounded by the fluid circulation groove and the high pressure fluid side. However, the other basic configurations are the same as the second embodiment: that is, at least the sectional area of the groove in the inlet section 10a or the outlet section 10b is set to be different from the sectional area of the groove in the communication section 10c in such a manner that the pressure of the fluid flowing through the fluid circulation groove 10 is lowered in the communication section 10c, more specifically, the sectional area of the groove in the inlet section 10a is set to be smaller than the sectional area of the groove in the communication section 10c and the outlet section 10b, or the sectional area of the groove in the outlet section 10b is set to be larger than the sectional area of the groove in the communication section 10c and the inlet section 10a, and thus the leakage of the fluid to the low pressure fluid side from the communication section 10c placed in the part of the fluid circulation groove 10 which is the nearest to the low pressure fluid side can be furthermore reduced. The same members will be given the same reference signs and duplicated description will be omitted.

In FIG. 8(a), on the sealing face in which the fluid circulation grooves 10 are provided, the positive pressure generation mechanism 11 including the positive pressure generation groove 11a that is shallower than the fluid circulation groove 10 is provided in the part surrounded by each of the fluid circulation grooves 10 and the high pressure fluid side, and further, a negative pressure generation mechanism 12 including a negative pressure generation groove 12a that is shallower than the fluid circulation groove 10 is provided on the outside of the part surrounded by the fluid circulation groove 10 and the high pressure fluid side, that is, between the adjacent fluid circulation grooves 10, 10. The negative pressure generation groove 12a communicates with the inlet section 10a, and is isolated from the outlet section 10b and the low pressure fluid side by the land section R.

In this example, the negative pressure generation mechanism 12 is formed from a reversed Rayleigh step mechanism including a groove 12a that communicates with the inlet section 10a of the fluid circulation groove 10 on the upstream side and a reversed Rayleigh step 12b. However, the present invention is not limited to this. The point is that the negative pressure generation mechanism may be formed from any mechanism that generates negative pressure.

The reversed Rayleigh step mechanism will be described in detail later.

FIG. 8(b) is different from FIG. 8(a) in a point that four fluid circulation grooves 10 are arranged at equal intervals in the circumferential direction, and the groove 12a of the reversed Rayleigh step mechanism 12 provided between the adjacent fluid circulation grooves 10, 10 is formed to be longer in the circumferential direction than the groove 12a of FIG. 8(a). However, the other configurations are the same as FIG. 8(a).

In the third embodiment, the negative pressure generation mechanism 12 plays a role of taking the sealed fluid to be leaked out from the high pressure fluid side to the low pressure fluid side due to generation of negative pressure into the negative pressure generation groove 12a, and returning the fluid to the high pressure fluid side via the fluid circulation groove 10 so as to improve a sealing property. The negative pressure generation mechanism prevents leakage between the adjacent fluid circulation grooves 10 and 10 in the part where no positive pressure generation mechanism 11 is provided, so as to improve a sealing property of the entire sealing faces.

It should be noted that optimal values can be appropriately selected as the number of the positive pressure generation mechanism 11 and the negative pressure generation mechanism 12 to be arranged at equal intervals, and the ratio of the length between the positive pressure generation mechanism 11 and the negative pressure generation mechanism 12.

Fourth Embodiment

Figure 9:
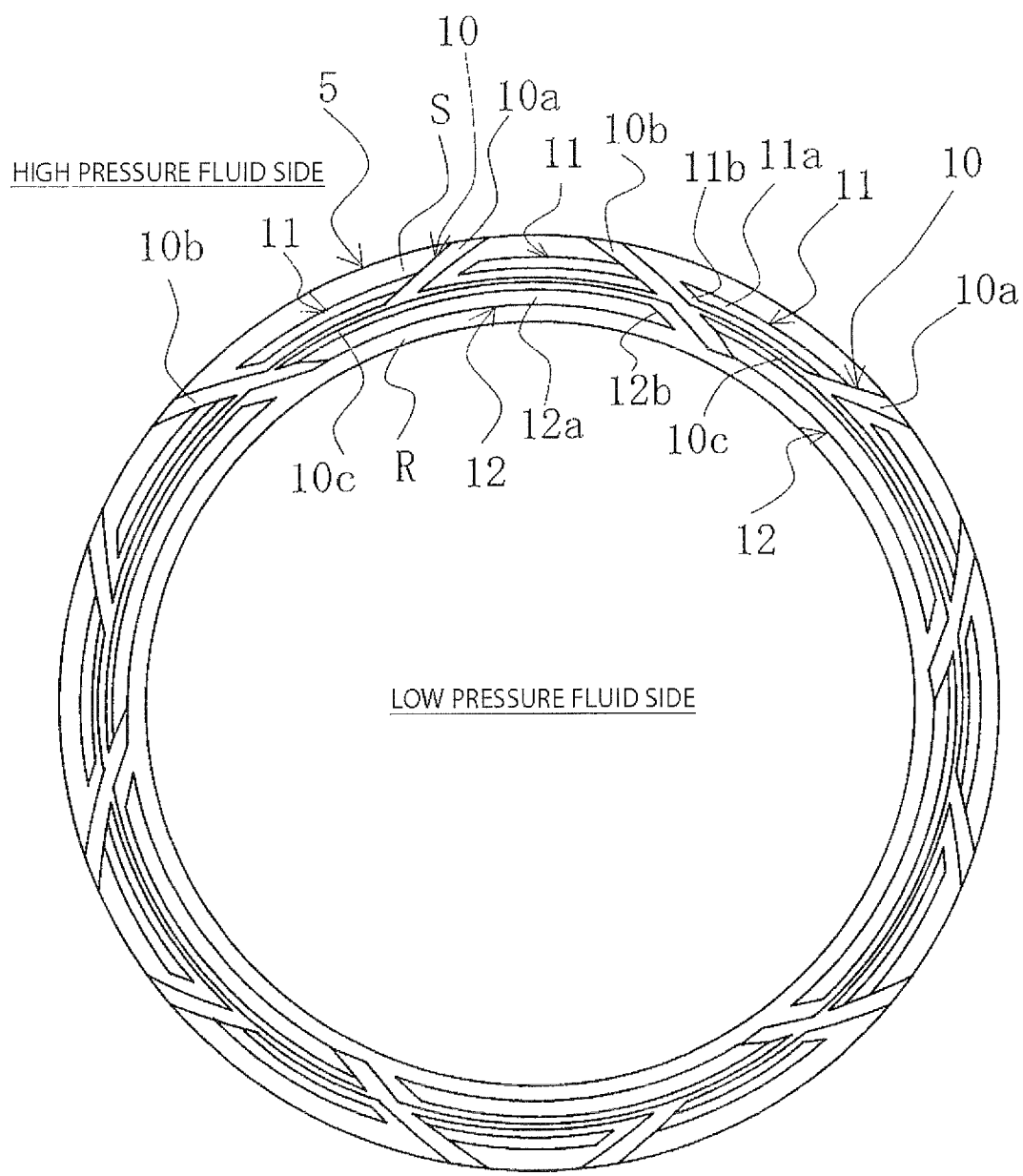
FIG. 9 shows a sealing face of a sliding part according to a fourth embodiment of the present invention.

With reference to FIG. 9, sliding parts according to a fourth embodiment of the present invention will be described.

The same members as the embodiments described above will be given the same reference signs and duplicated description will be omitted.

In the sliding parts according to the fourth embodiment, the positive pressure generation mechanisms 11 including the positive pressure generation grooves 11a are provided on the high pressure side of the sealing face, the negative pressure generation mechanisms 12 including the negative pressure generation grooves 12a are provided on the low pressure side, the communication section 10c of the fluid circulation grooves 10 is arranged between the positive pressure generation grooves 11a and the negative pressure generation grooves 12a over the entire circumference, the inlet sections 10a are arranged in such a manner that the upstream side of the positive pressure generation grooves 11a and the communication section 10c communicate with the high pressure fluid side, and the outlet sections 10b that provide communication between the downstream side of the negative pressure generation grooves 12a and the communication section 10c, and the high pressure fluid side are arranged. The inlet sections 10a and the outlet sections 10b are inclined in the directions in which the sections respectively open from the low pressure side toward the high pressure side.

In the fourth embodiment, the communication section 10c of the fluid circulation grooves 10 arranged between the positive pressure generation grooves 11a and the negative pressure generation grooves 12a plays a role of taking the fluid to flow into the side of the negative pressure generation mechanisms 12 from the side of the positive pressure generation mechanisms 11 and discharging the fluid to the high pressure fluid side. The communication section prevents the leakage on the sealing faces so as to improve the sealing property.

The following configuration is the same as the embodiments described above: at least the sectional area of the groove in the inlet section 10a or the outlet section 10b is set to be different from the sectional area of the groove in the communication section 10c in such a manner that the pressure of the fluid flowing through the fluid circulation groove 10 is lowered in the communication section 10c, more specifically, the sectional area of the groove in the inlet section 10a is set to be smaller than the sectional area of the groove in the communication section 10c and the outlet section 10b, or the sectional area of the groove in the outlet section 10b is set to be larger than the sectional area of the groove in the communication section 10c and the inlet section 10a, and thus the leakage of the fluid to the low pressure fluid side from the communication section 10c placed in the part of the fluid circulation groove 10 which is the nearest to the low pressure fluid side can be furthermore reduced.

Figure 10:
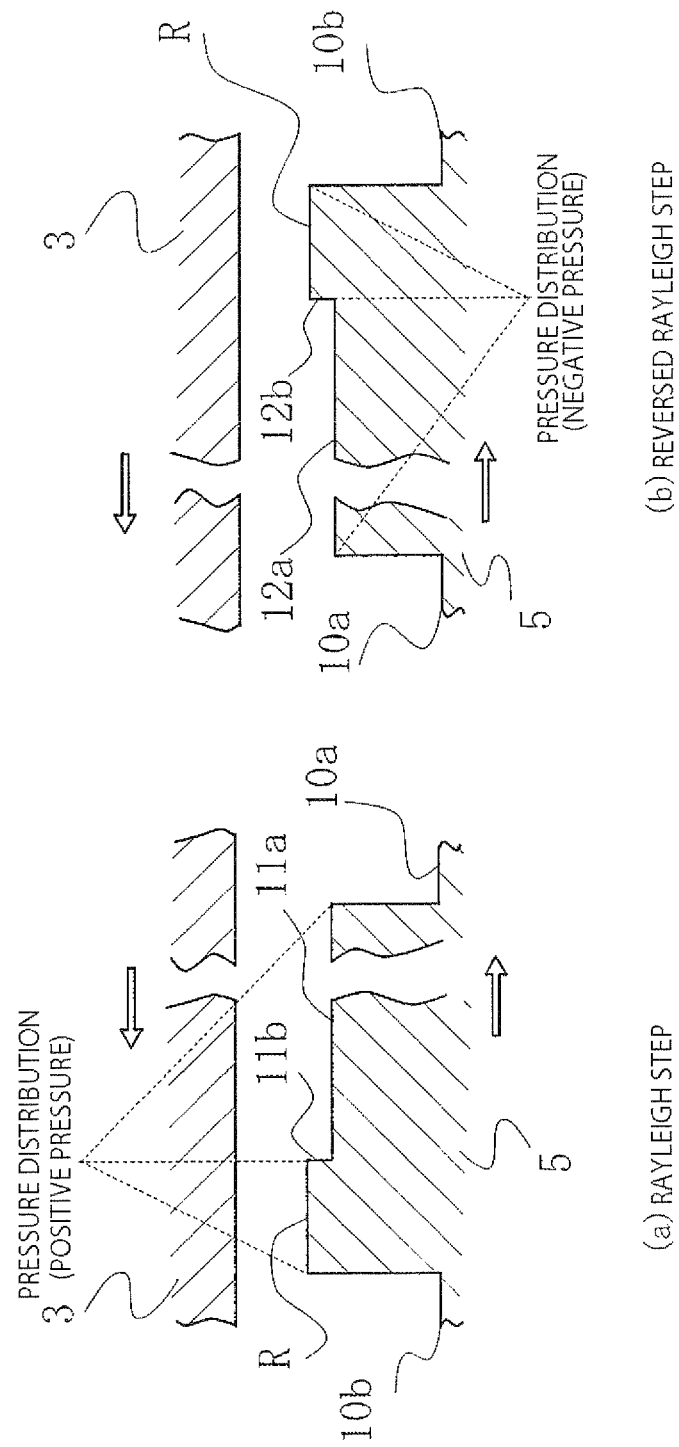

Next, with reference to FIG. 10, the positive pressure generation mechanism formed from the Rayleigh step mechanism or the like and the negative pressure generation mechanism formed from the reversed Rayleigh step mechanism or the like will be described.

In FIG. 10(a), the rotating ring 3 and the stationary ring 5 serving as the opposing sliding parts relatively slide on each other as shown by arrows. For example, the Rayleigh step 11b is formed on the sealing face of the stationary ring 5 so as to be perpendicular to the relative movement direction and facing the upstream side, and a groove section 11a serving as the positive pressure generation groove is formed on the upstream side of the Rayleigh step 11b. The opposing sealing faces of the rotating ring 3 and the stationary ring 5 are flat.

When the rotating ring 3 and the stationary ring 5 are relatively moved in the directions shown by the arrows, the fluid placed between the sealing faces of the rotating ring 3 and the stationary ring 5 follows and moves in the movement direction of the rotating ring 3 or the stationary ring 5 due to the viscous property thereof. Thus, at that time, positive pressure (dynamic pressure) as shown by broken lines is generated due to existence of the Rayleigh step 11b.

It should be noted that the reference signs 10a and 10b denote the inlet section and the outlet section of the fluid circulation groove, and the reference sign R denotes the land section.

In FIG. 10(b), the rotating ring 3 and the stationary ring 5 serving as the opposing sliding parts also relatively slide on each other as shown by arrows. However, the reversed Rayleigh step 12b is formed on the sealing faces of the rotating ring 3 and the stationary ring 5 so as to be perpendicular to the relative movement direction and facing the downstream side, and a groove section 12a serving as the negative pressure generation groove is formed on the downstream side of the reversed Rayleigh step 12b. The opposing sealing faces of the rotating ring 3 and the stationary ring 5 are flat.

When the rotating ring 3 and the stationary ring 5 are relatively moved in the directions shown by the arrows, the fluid placed between the sealing faces of the rotating ring 3 and the stationary ring 5 follows and moves in the movement direction of the rotating ring 3 or the stationary ring 5 due to the viscous property thereof. Thus, at that time, negative pressure (dynamic pressure) as shown by broken lines is generated due to existence of the reversed Rayleigh step 12b.

It should be noted that the reference signs 10a and 10b denote the inlet section and the outlet section of the fluid circulation groove, and the reference sign R denotes the land section.

The embodiments of the present invention are described above with the drawings. However, specific configurations are not limited to these embodiments but modifications and additions that are made within the range not departing from the gist of the present invention are also included in the present invention.

For example, although the example that the sliding parts are used for any of a pair of rotating and stationary sealing rings in a mechanical seal device is described in the above embodiments, the sliding parts can also be utilized as sliding parts of a bearing that slides on a rotating shaft while sealing lubricating oil on one side in the axial direction of a cylindrical sealing face.

In addition, for example, although the case where the high-pressure sealed fluid exists on the outer peripheral side is described in the above embodiments, the present invention can also be applied to a case where the high-pressure fluid exists on the inner peripheral side.

In addition, for example, although the case where the fluid circulation groove, the positive pressure generation mechanism, and the negative pressure generation mechanism are provided in the stationary ring of the mechanical seal that forms the sliding parts is described in the above embodiments, the fluid circulation groove, the positive pressure generation mechanism, and the negative pressure generation mechanism may be reversely provided in the rotating ring. In that case, the fluid circulation groove is not required to be provided up to the outer peripheral side of the rotating ring but only required to communicate with the sealed fluid side.

REFERENCE SIGNS LIST

1 Rotating shaft
2 Sleeve
3 Rotating ring
4 Housing
5 Stationary ring
6 Coiled wave spring
7 Bellows
10 Fluid circulation groove
11 Positive pressure generation mechanism (Rayleigh step mechanism)
12 Negative pressure generation mechanism (reversed Rayleigh step mechanism)
R Land section
S Sealing face

The invention claimed is:

1. A pair of sliding parts comprising sealing faces that relatively slide on each other, wherein:
a fluid circulation groove including an inlet section where a fluid comes in from a high pressure fluid side, an outlet section where the fluid goes out to the high pressure fluid side, and a communication section that provides communication between the inlet section and the outlet section is provided in one of the sealing faces;
the fluid circulation groove is isolated from a low pressure fluid side by a land section;
the inlet section and the outlet section respectively including an inlet face and an outlet face facing a high pressure fluid side on an periphery surface in the one of the sliding parts, and
each area of the inlet face and the outlet face is defined by a width and a depth thereof, the area of the outlet face is larger than that of the inlet face in the communication section in such a manner that pressure of the fluid flowing through the fluid circulation groove is lowered in the communication section.

2. The sliding parts according to claim 1, wherein:
each sectional area of the inlet section, the outlet section and the communication section is defined by a width and a depth thereof and wherein:
the sectional area of the groove in the inlet section is set to be smaller than the sectional area of the groove in the communication section and the outlet section.

3. The sliding parts according to claim 1, wherein:
the sectional area of the groove in the outlet section is set to be larger than the sectional area of the groove in the communication section and the inlet section.

4. The sliding parts according to claim 1, wherein:
the plurality of fluid circulation grooves is provided in the circumferential direction of the sealing face and isolated by the land section.

5. The sliding parts according to claim 1, wherein:
a positive pressure generation mechanism including a positive pressure generation groove that is shallower than the fluid circulation groove is provided in a part surrounded by the fluid circulation groove and the high pressure fluid side; and
the positive pressure generation mechanism communicates with the inlet section on a downstream side of the inlet section, and is isolated from the outlet section and the high pressure fluid side by the land section.

6. The sliding parts according to claim 5, wherein:
the positive pressure generation mechanism is formed from a Rayleigh step mechanism.

7. The sliding parts according to claim 6, wherein:
a negative pressure generation mechanism including a negative pressure generation groove that is shallower than the fluid circulation groove is provided on the outside of the part surrounded by the fluid circulation groove of one of the sealing faces and the high pressure fluid side; and
the negative pressure generation groove communicates with the inlet section on an upstream side of the inlet section, and is isolated from the outlet section and the low pressure fluid side and the high pressure fluid side by the land section.

8. The sliding parts according to claim 7, wherein:
the negative pressure generation mechanism is formed from a reversed Rayleigh step mechanism.

9. The sliding parts according to claim 5, wherein:
a negative pressure generation mechanism including a negative pressure generation groove that is shallower than the fluid circulation groove is provided on the outside of the part surrounded by the fluid circulation groove of one of the sealing faces and the high pressure fluid side; and
the negative pressure generation groove communicates with the inlet section on an upstream side of the inlet section, and is isolated from the outlet section and the low pressure fluid side and the high pressure fluid side by the land section.

10. The sliding parts according to claim 9, wherein:
the negative pressure generation mechanism is formed from a reversed Rayleigh step mechanism.

11. The sliding parts according to claim 1, wherein:
a positive pressure generation mechanism including a positive pressure generation groove is provided on a high pressure side of one of the sealing faces, and a negative pressure generation mechanism including a negative pressure generation groove is provided on a low pressure side;
the communication section is arranged between the positive pressure generation groove and the negative pressure generation groove;
the inlet section is arranged in such a manner that an upstream side of the positive pressure generation groove and the communication section communicate with the high pressure fluid side;
the outlet section that provides communication between a downstream side of the negative pressure generation groove and the communication section, and the high pressure fluid side is arranged; and
the inlet section and the outlet section are inclined in the directions in which the sections respectively open from the low pressure side toward the high pressure side.

12. The sliding parts according to claim 11, wherein: a crossing angle between the inlet section and the outlet section is set to be an obtuse angle.

13. The sliding parts according to claim 11, wherein: a crossing angle between the inlet section and the outlet section is set to be 150° or more and 180° or less.

* * * * *